US006702355B1

(12) United States Patent
Price et al.

(10) Patent No.: US 6,702,355 B1
(45) Date of Patent: Mar. 9, 2004

(54) MULTI-FUNCTION SECURITY SHADE PANEL FOR A VEHICLE

(75) Inventors: Clifford Lee Price, Sterling Heights, MI (US); Heidi H. McAdoo-Wilson, Windsor (CA); Mark R. Hinzmann, Allen Park, MI (US)

(73) Assignee: General Motors Corporation, Detroit, MI (US)

( * ) Notice: Subject to any disclaimer, the term of this patent is extended or adjusted under 35 U.S.C. 154(b) by 25 days.

(21) Appl. No.: 10/267,519

(22) Filed: Oct. 9, 2002

(51) Int. Cl.[7] ............................................... B60R 7/00
(52) U.S. Cl. ............................. 296/37.16; 296/65.09; 296/65.16; 297/334
(58) Field of Search ..................... 296/37.8, 37.16, 296/24.1, 64, 65.01, 66, 65.05, 65.09, 65.16; 160/226, 227; 297/334, 335, 336

(56) References Cited

U.S. PATENT DOCUMENTS

| | | | | |
|---|---|---|---|---|
| 4,277,097 A | * | 7/1981 | Lalanne | 296/37.16 |
| 4,289,345 A | | 9/1981 | Tamamushi et al. | 296/37.16 |
| 4,351,555 A | * | 9/1982 | Hashimoto | 296/37.16 |
| 4,443,034 A | * | 4/1984 | Beggs | 296/65.17 |
| 4,536,025 A | * | 8/1985 | Yamawaki et al. | 296/37.16 |
| 5,011,208 A | | 4/1991 | Lewallen | 296/37.16 |
| 5,213,387 A | | 5/1993 | Decker et al. | 296/37.16 |
| 5,224,748 A | | 7/1993 | Decker et al. | 296/37.16 |
| 5,238,284 A | * | 8/1993 | Whitaker | 296/37.16 |
| 5,464,052 A | | 11/1995 | Wieczorek et al. | 160/23.1 |
| 5,547,187 A | * | 8/1996 | Spykerman | 296/37.16 |
| 5,716,091 A | | 2/1998 | Wieczorek | 296/37.16 |
| 6,039,105 A | | 3/2000 | Patmore et al. | 160/24 |
| 6,065,794 A | * | 5/2000 | Schlachter | 296/37.6 |
| 6,113,172 A | * | 9/2000 | Chaloult et al. | 296/26.08 |
| 6,176,535 B1 | * | 1/2001 | Chaloult et al. | 296/37.16 |
| 6,290,277 B1 | * | 9/2001 | Spykerman et al. | 296/24.1 |
| 6,336,670 B1 | * | 1/2002 | Sav.ang.s | 296/37.16 |
| 6,406,083 B2 | * | 6/2002 | Bharj et al. | 296/37.16 |
| 6,508,499 B1 | * | 1/2003 | Guanzon et al. | 296/37.1 |

* cited by examiner

Primary Examiner—Dennis H. Pedder
Assistant Examiner—Patricia L. Engle
(74) Attorney, Agent, or Firm—Laura C. Hargitt

(57) ABSTRACT

A movable panel attached to a seat assembly serves as both a security shade for a motor vehicle cargo area and as a close-out panel to close gaps in the cargo loading floor. The panel is pivotable and extendible to conceal the cargo area when the seatback is upright, and is pivotable and extendible to create a flat cargo load floor when the seatback is stowed.

19 Claims, 4 Drawing Sheets

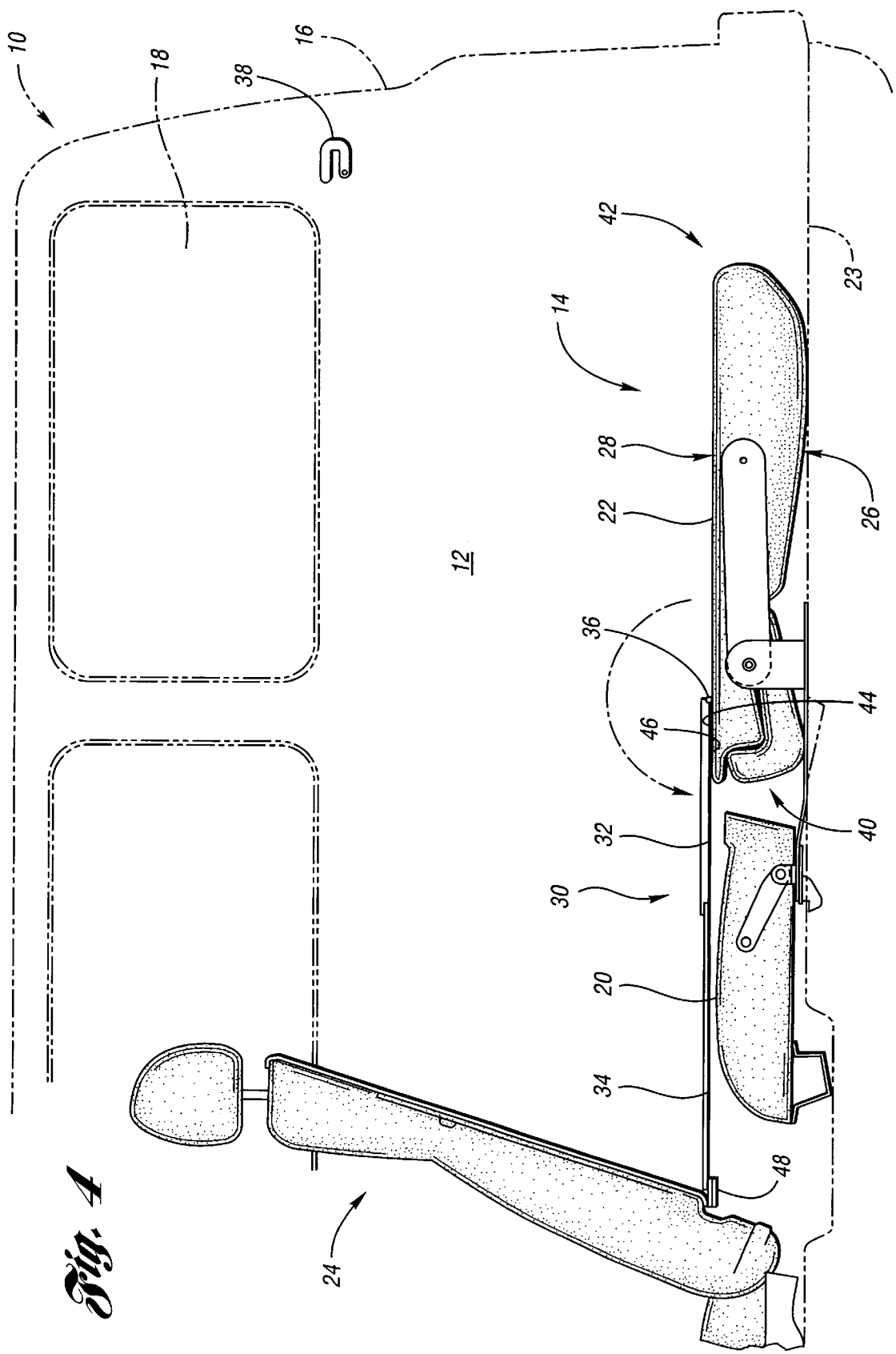

MULTI-FUNCTION SECURITY SHADE PANEL FOR A VEHICLE

FIELD OF THE INVENTION

This invention relates to a security shade which is on the back of a vehicle seat and is movable to either extend a cargo floor when the vehicle seat is stowed or to conceal a cargo area from view from the exterior of the vehicle.

BACKGROUND OF THE INVENTION

Many vehicles, such as hatchbacks, minivans, and sport-utility vehicles, have a cargo area located in the rear of the vehicle. This cargo area and its contents are often viewable from outside the vehicle. For privacy and security reasons, it is desirable to prevent passers-by from viewing the contents of the cargo area.

The prior art includes security shades that are extendible and retractable to alternatively conceal the cargo area from view from outside the vehicle, and to permit access to the cargo area by the vehicle user and to accommodate larger items. Prior art security shades typically comprise a flexible fabric panel wrapped onto a spring-loaded roller tube. The roller tube is rotatably mounted to the interior trim of the vehicle behind a seat assembly and extends transversely across the width of the vehicle behind a seat assembly. The flexible fabric panel is extendible and retractable across the cargo area. See, for example, U.S. Pat. No. 5,224,748, issued Jul. 6, 1993 to Decker, et al.

On many vehicles, the seat assembly is stowable or collapsible to expand the cargo area. Prior art security shades that are mounted to the interior trim of the vehicle may create a physical obstruction in the expanded cargo area when the seat assembly is stowed. Some prior art security shades are detachable from their mounting to avoid obstruction of the expanded cargo area. See, for example, U.S. Pat. No. 6,039,105, issued Mar. 21, 2000 to Patmore, et al., which illustrates an attachment device intended to facilitate the installation and removal of a security shade from a vehicle. Although detachment of the security shade eliminates physical obstruction of the expanded cargo area, it is not ideal because it requires an additional vehicle user action and a place to stow the security shade.

The cross body motor vehicle security shade described in U.S. Pat. No. 5,213,387, issued May 25, 1993 to Decker, et al., eliminates obstruction of the expanded cargo area when a seat assembly is stowed because the roller tube is positioned along a side of the vehicle and the flexible panel extends transversely across the vehicle to cover the cargo area. However, flexible fabric security shades may involve certain disadvantages such as being cumbersome to extend and retract.

Some prior art vehicles include trim panels movably mounted within the vehicles and configured to close gaps between seat assemblies and vehicle cargo floors. These trim panels are commonly referred to as "close-out panels" and "flipper panels" by those familiar with the art. An example of a flipper panel is found in U.S. Pat. No. 5,716,091, issued Feb. 10, 1998 to Wieczorek.

DISCLOSURE OF THE INVENTION

The present invention provides a multi-function panel for use in a vehicle that has a stowable seat assembly adjacent to a cargo area. The seat assembly typically includes a seatback member and a seat cushion member. The seatback member has a cargo load surface that is opposite the seating surface, and that generally faces the cargo area when the seatback is upright. When the seat assembly is stowed to expand the cargo area, the seatback member is positioned such that the cargo load surface faces generally upward and functions as a cargo floor for the expanded cargo area.

The panel is mounted with respect to the cargo load surface and, when the seatback member is upright, is movable between a first configuration in which the panel is stowed by laying along the cargo load surface, and a second configuration in which the panel is generally horizontal and extends above or over the cargo area.

When the seatback member is in its stowed position, the panel is preferably movable between a third configuration and a fourth configuration. In the third configuration, the panel rests along the cargo load surface of the collapsed seatback member, thereby preventing its obstruction of the expanded cargo area. In the fourth configuration, the panel extends from a point on the cargo load surface to a point beyond the cargo load surface, and functions to either extend the length of the cargo floor formed by the cargo load surface, or to close a gap between the collapsed seatback member and a second seat assembly.

The panel may be pivotably attached directly to the surface of the, seatback, and may be variably extendible and retractable to accommodate the situation where the length of the panel necessary to conceal the cargo area from view is different from the length necessary to extend the cargo floor or stow the panel.

The present invention improves upon the prior art by providing a mechanically simple security shade that does not obstruct the cargo area when the adjacent seat assembly is collapsed or removed. The present invention also improves upon the prior art by combining a security shade and a flipper, or close-out, panel, thereby reducing the number of parts and therefore the weight and complexity of a vehicle.

The above objects, features, and advantages, and other objects, features, and advantages, of the present invention are readily apparent from the following detailed description of the best mode for carrying out the invention when taken in connection with the accompanying drawings.

BRIEF DESCRIPTION OF THE DRAWINGS

FIG. 4 is a schematic side elevational view of the multi-function security shade flipper panel in its close-out panel configuration.

DETAILED DESCRIPTION OF THE PREFERRED EMBODIMENT

Figure 1:
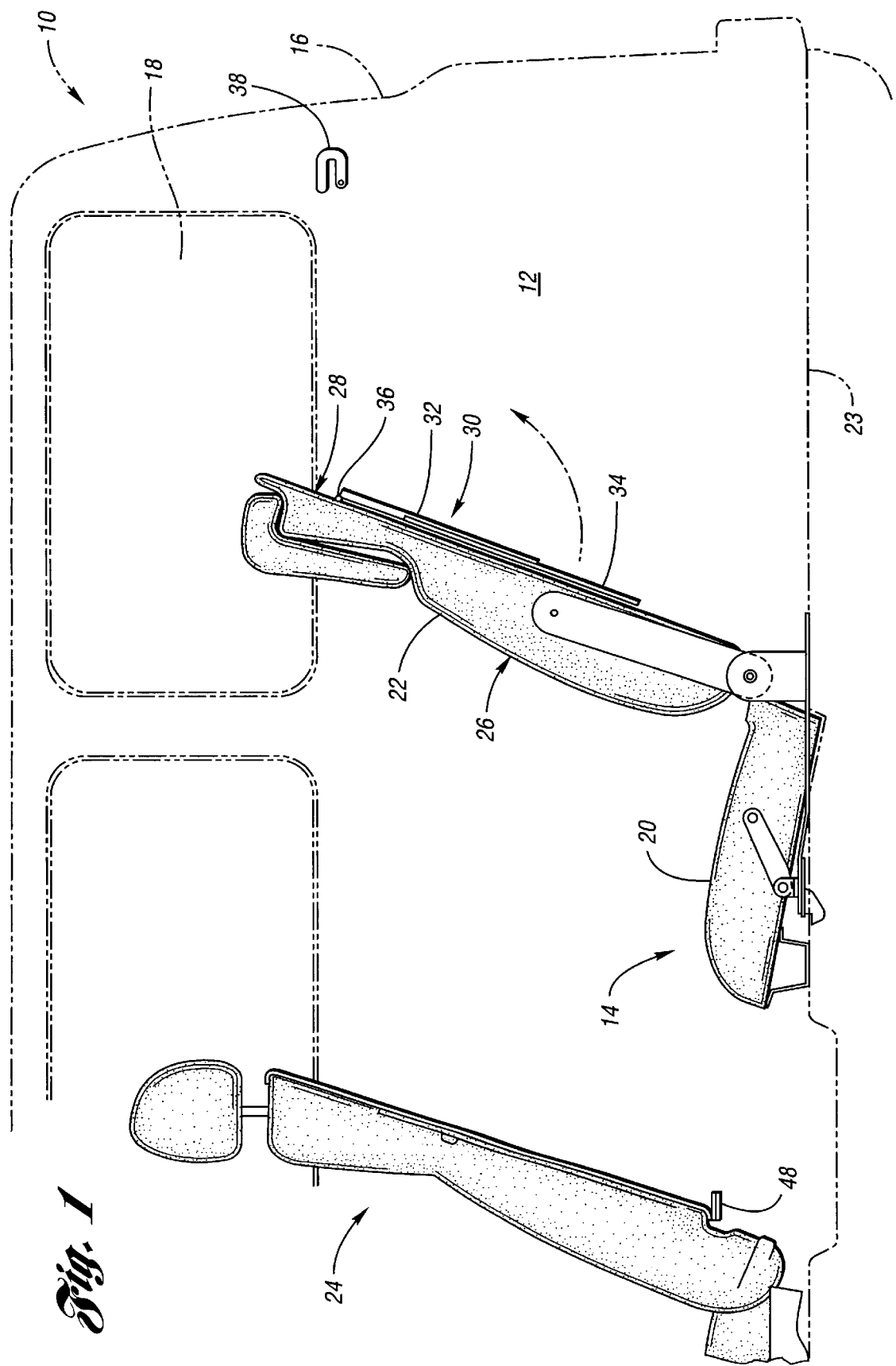
FIG. 1 is a schematic side elevational view of the multi-function security shade flipper panel in a stowed configuration with the seat assembly in an upright, occupiable position in a vehicle.

FIG. 1 depicts a vehicle 10 having a cargo area 12 that is bordered by a rear seat assembly 14 and a rear vehicle closure 16 such as a rear liftgate. Glass windows 18 provide occupants of the vehicle 10 with visibility to the exterior of the vehicle 10. The glass windows 18 also allow the cargo area 12 and any belongings therein to be viewed from the exterior of the vehicle 10.

The rear seat assembly 14 includes a seat cushion member 20 and a seatback member 22, and is mounted to a vehicle floor 23. An intermediate seat assembly 24 is mounted to the vehicle floor 23 forward of the rear seat assembly 14. The seatback member 22 of the rear seat assembly 14 is depicted in an upright, occupiable position in FIG. 1.

For occupant comfort, the seat cushion member 20 includes springs or padding, and its surface is a soft, pliant material such as cloth or leather. The seatback member 22 has a generally forward-facing seating, or occupiable, surface 26 against which an occupant of the rear seat assembly 14 rests. The seatback member 22 has a cargo load surface 28 opposite the seating, or occupiable, surface 26 that generally faces the cargo area 12 when the seatback member 22 is upright. Similar to the seat cushion member 20, the seatback member 22 contains springs or padding, and the seating surface 26 is a soft, pliant material such as cloth or leather for occupant comfort.

The rear seat assembly 14 is depicted in FIGS. 1–4 as a bench seat, such that it extends substantially across the width of the interior of the vehicle 10. However, those skilled in the art will recognize a multitude of different seat assembly types and configurations that may be employed within the scope of the claimed invention, such as split bench seat assemblies, bucket seat assemblies, split-seatback bench seat assemblies, rearwardly-facing seat assemblies, etc.

A panel 30, having a fixed length portion 32 and a telescoping portion 34, is pivotably mounted to the cargo load surface 28 by a hinge 36. Those skilled in the art will recognize that a multitude of materials are suitable for panel 30 construction within the scope of the claimed invention. For example, the panel 30 may be an injection molded polymer material, etc. The panel 30 is movable between four configurations. The function that the panel 30 performs in each configuration may require a different panel length. Therefore, the panel 30 is preferably variably extendible and retractable. In the preferred embodiment, the panel 30 is telescopically extendible and retractable. The length of the panel 30 is adjustable by moving the telescoping portion 34 relative to the fixed length portion 32.

The first configuration of the panel 30 is depicted in FIG. 1. When the seatback member 22 is in its upright, occupiable position, the panel 30 is stowed by positioning the panel 30 such that it lies along or against the cargo load surface 28. The panel 30 may be held in place by a fastening device (not shown) such as a clip or hook and loop fastener. In the first configuration, the panel 30 does not obstruct the cargo area 12, which is useful when access to the cargo area 12 is required, or to accommodate large items that otherwise could not fit in the cargo area 12. The telescoping portion 34 of the panel 30 may be moved relative to the fixed length portion 32 to reduce the length of the panel 30 to facilitate compact storage along the seatback member 22.

Figure 2:
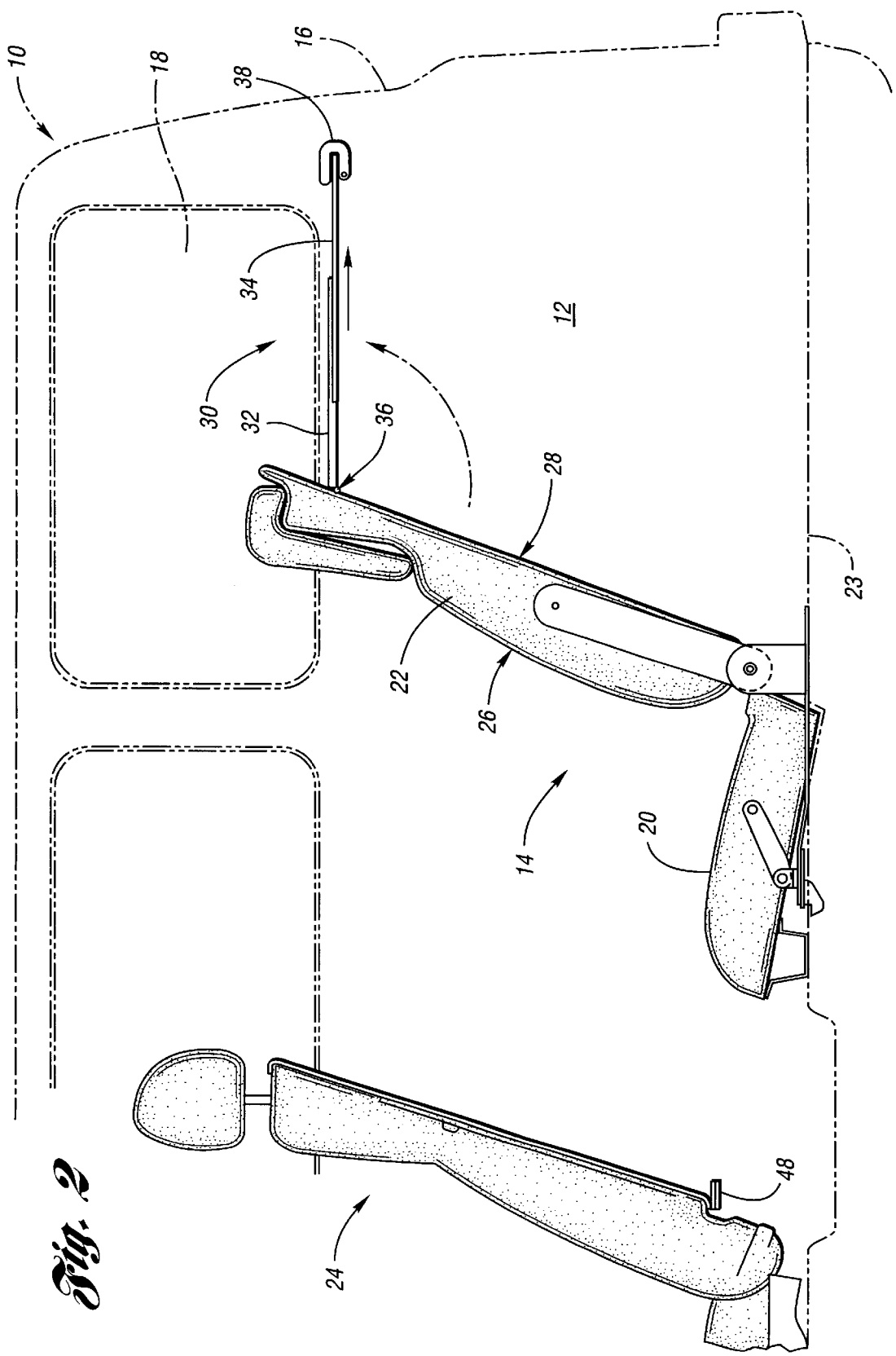
FIG. 2 is a schematic side elevational view of the multi-function security shade flipper panel in its security shade configuration.

The panel 30 functions as a security shade in the second configuration, as depicted in FIG. 2. To function as a security shade, the seatback member 22 is in its upright, occupiable position, and the panel 30 is rotated about the hinge 36 to a substantially horizontal position such that the panel 30 extends above the cargo area 12. The panel 30 at least partially conceals the cargo area 12 from view from the exterior of the vehicle 10 but does not affect the visibility of passengers to the exterior of the vehicle 10. The length of the panel 30 is adjusted by moving the telescoping portion 34 relative to the fixed length portion 32, such that the panel 30 extends across the cargo area 12. A support member 38 supports the panel 30 in the second configuration. The support member in the preferred embodiment shown in FIG. 2 is a slot formed in a body-side interior trim panel (not shown).

It may be advantageous to employ more than one panel, particularly in a vehicle that employs a split bench seat assembly or a bucket seat assembly bordering a cargo area. For example, in a vehicle with a split bench seat assembly having two or more independently-movable seatback members bordering a cargo area, each of the independently-movable seatback members may have a panel attached thereto and movable between four configurations as described herein. Each of the panels may extend above a portion of the cargo area, at least partially concealing the cargo area from view. Collectively, the panels may extend above all or substantially all of the cargo area, concealing all or substantially all of the cargo area from view. If there are any gaps between the panels, one or more of the panels may have a bridging panel attached thereto and configured to close the gap. Similarly, in a vehicle having a cargo area bordered by two or more bucket seat assemblies, each of the bucket seat assemblies may have a panel attached to its seatback member.

Figure 3:
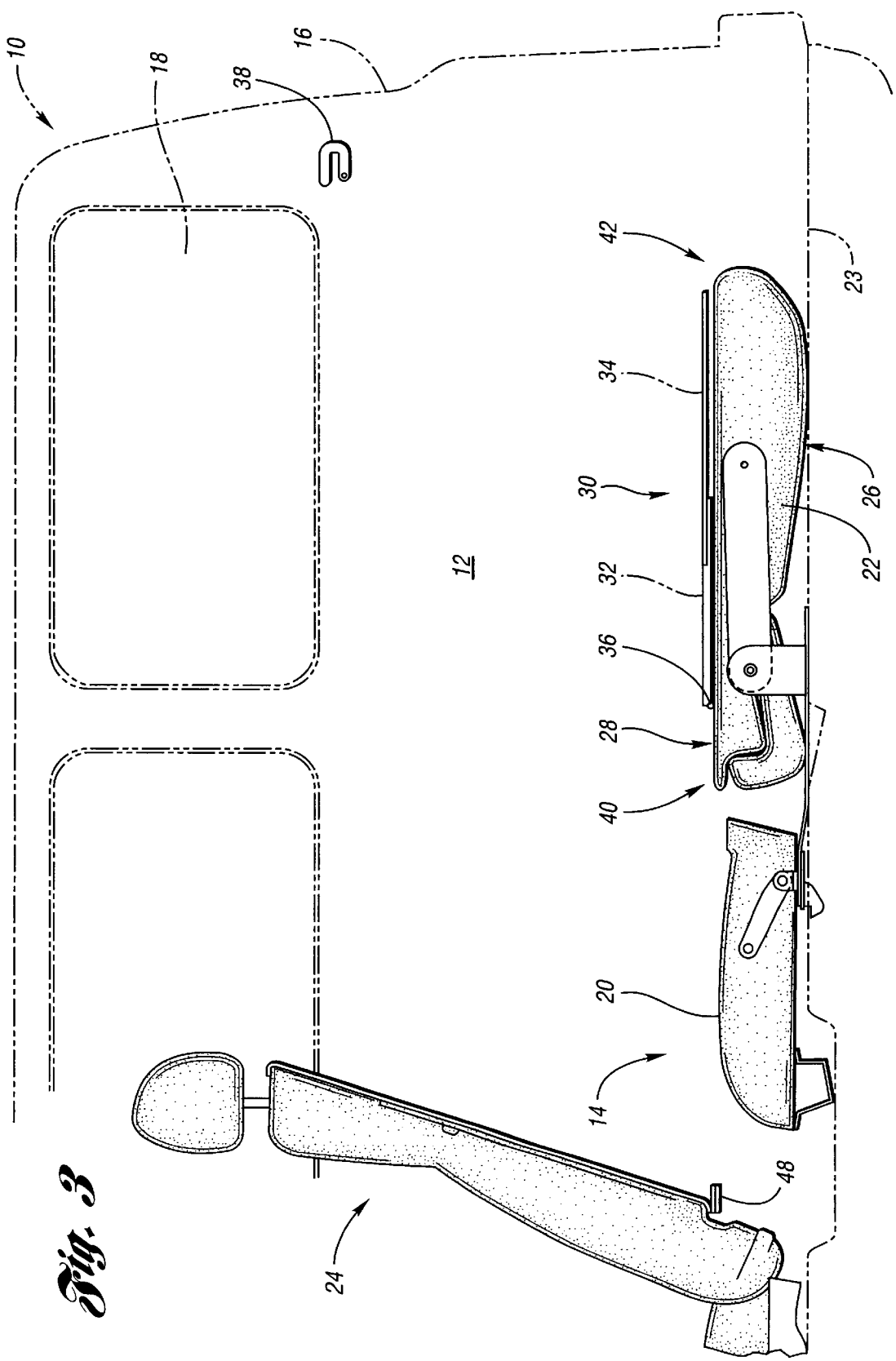
FIG. 3 is a schematic side elevational view of the multi-function security shade flipper panel in a stowed configuration with the seat assembly in a stowed position.

The seatback member 22 is movable between the generally upright, occupiable position as shown in FIGS. 1 and 2, and a generally horizontal, stowed position as shown in FIG. 3, in which the seatback member 22 extends from a forward extent 40 to a rearward extent 42. A preferred embodiment of the rear seat assembly 14 is depicted in FIGS. 1–4, wherein the seating surface 26 is juxtaposed to the vehicle floor 23 when the seatback member 22 is in its stowed position. However, those skilled in the art will recognize a multitude of other seat assembly designs that provide a seatback member movable between a generally upright, occupiable position and a generally horizontal stowed position within the scope of the claimed invention and with or without movement of the seat cushion member between the occupiable and stowable positions. For example, the seatback member may fold over the seat cushion member.

When the seatback member 22 is stowed, the cargo area 12 is expanded and is bordered by the intermediate seat assembly 24, as depicted in FIG. 3. The cargo load surface 28 faces generally upward when the seatback member 22 is stowed and forms part of the lower surface of the extended cargo area 12. The cargo load surface 28 should therefore be a strong, durable, and scratch-resistant material to avoid damage caused by the weight or movement of any cargo placed upon it.

The third configuration of the panel 30 is depicted in FIG. 3. When the seatback member 22 is stowed, the panel 30 is rotated about the hinge 36 such that it lies along or against the cargo load surface 28. The third configuration is particularly useful when the panel 30 is employed with a seat assembly configured such that the forward extent of its stowed seatback member is adjacent to an intermediate seat assembly. In the third configuration, the stowed panel 30 does not physically obstruct the expanded cargo area 12.

In FIG. 4, the panel 30 is depicted in its fourth configuration in which it functions as a "close-out" or "flipper" panel. When the seatback member 22 is folded to its stowed position to expand the cargo area 12, the panel 30 is rotated about the hinge 36 to extend from the hinge 36 to a point forward of the cargo load surface 28. Ideally, the panel 30 will extend such that it is in close proximity to, or in contact with, the intermediate seat assembly 24. The length of the panel 30 is adjusted as necessary by moving the telescoping portion 34 relative to the fixed length portion 32. The panel 30 is supported in the fourth configuration by the hinge 36, a segment 44 of the cargo load surface 28 with which a segment 46 of the panel 30 is contiguous, and a support member 48 located on the intermediate seat assembly 24. Alternatively, in other embodiments, the panel 30 could be supported in the fourth configuration by the seat cushion member 30, another support member located on an interior trim panel or on the vehicle floor 23, etc.

The soft and pliant material of the seat cushion member 20 may be damaged if cargo is placed directly on it. In the preferred embodiment, the panel 30 at least partially covers the seat cushion member 20 in the fourth configuration, thereby protecting it from cargo placed in the expanded cargo area 12.

The panel 30 also functions as part of the lower surface of the expanded cargo area 12 in the fourth configuration. The panel 30 facilitates cargo stability during transport, as well as cargo loading and unloading, because the panel 30 is substantially coplanar with the cargo load surface 28. The panel 30 also helps to prevent cargo from rolling or sliding into any gap between the intermediate seat assembly 24 and the rear seat assembly 14.

Note that a panel that is the subject of the invention may be attached to the intermediate seat assembly 24 and moved between the first and second panel configuration, and, provided that the seatback member of the intermediate seat assembly 24 is movable to a generally horizontal, stowed position, the third and fourth configurations.

Although the description of this invention has been given with reference to a particular embodiment, it is not to be construed in the limiting sense. Many variations and modifications will now occur to those skilled in the art. For a definition of the invention, reference is made to the appended claims.

What is claimed is:

1. A security shade apparatus for a vehicle having a cargo area, the security shade apparatus comprising:
   a seat assembly adjacent to the cargo area, the seat assembly having a seat cushion member and a seatback member, the seatback member having a surface that generally faces the cargo area when the seatback member is in a generally upright, occupiable position; and
   said seat assembly including a panel, movably mounted with respect to the surface of the seatback member for movement between a first configuration in which the panel lays along the surface of the seatback member when the seatback member is in the occupiable position, and a second configuration in which the panel extends above the cargo area and at least partially conceals the cargo area from view from the exterior of the vehicle when the seatback member is in the occupiable position.

2. The security shade apparatus of claim 1, wherein the panel is pivotably mounted to the surface of the seatback member.

3. The security shade apparatus of claim 2, further comprising a hinge pivotably connecting the panel to the surface of the seatback member.

4. The security shade apparatus of claim 1, wherein the panel is variably extendible and retractable.

5. The security shade apparatus of claim 4, wherein the panel is variably telescopically extendible and retractable.

6. The security shade apparatus of claim 1, wherein the seatback member is movable between the upright, occupiable position and a generally horizontal stowed position in which the surface faces generally upward and extends from a forward extent to a rearward extent; and wherein the panel is movable to a third configuration in which the panel lays against the surface of the seatback member when the seatback member is in the stowed position.

7. A security shade apparatus for a vehicle having a cargo area, the security shade apparatus comprising:
   a seat assembly adjacent to the cargo area, the seat assembly having a seat cushion member and a seatback member, the seatback member having a surface that generally faces the cargo area when the seatback member is in a generally upright, occupiable position; and
   a panel, movably mounted with respect to the surface of the seatback member for movement between a first configuration in which the panel lays along the surface of the seatback member when the seatback member is in the occupiable position, and a second configuration in which the panel extends above the cargo area and at least partially conceals the cargo area from view from the exterior of the vehicle when the seatback member is in the occupiable position; and wherein the seatback member is movable between the upright, occupiable position and a generally horizontal stowed position in which the surface faces generally upward and extends from a forward extent to a rearward extent; and wherein the panel is movable to a third configuration in which the panel lays against the surface of the seatback member when the seatback member is in the stowed position; and wherein the panel is movable to a fourth configuration in which the panel extends from a point on the surface to a point forward of the forward extent when the seatback member is in the stowed position.

8. The security shade apparatus of claim 7, wherein the panel is variably extendible and retractable.

9. The security shade apparatus of claim 8, wherein the panel is variably extendible and retractable.

10. The security shade apparatus of claim 7, wherein the panel is pivotably mounted to the surface of the seatback member.

11. The security shade apparatus of claim 10, further comprising a hinge, the hinge pivotably connecting the panel to the surface of the seatback member.

12. The security shade apparatus of claim 7, further comprising a support member configured to support the panel in the second configuration.

13. A security shade assembly for a vehicle having a cargo area and comprising:
   a seatback member adjacent to the cargo area, the seatback member having a surface that generally faces the cargo area when the seatback member is in an upright, occupiable position, and
   a panel, movably mounted to the surface of the seatback member and with respect to the surface of the seatback member for movement between a first configuration in which the panel lays along the surface of the seatback member when the seatback member is in the occupiable position, and a second configuration in which the panel extends above the cargo area and at least partially conceals the cargo area from view from the exterior of the vehicle when the seatback member is in the occupiable position.

14. The security shade assembly of claim 13, wherein the seatback member is movable between the generally upright, occupiable position and a generally horizontal stowed position in which the surface faces generally upward and extends from a forward extent to a rearward extent; and wherein the panel is movable to a third configuration in which the panel lays against the surface of the seatback member when the seatback member is in the stowed position.

15. A security shade for a vehicle having a cargo area and a seatback member adjacent to the cargo area, the seatback member having a surface that generally faces the cargo area when the seatback member is in an upright, occupiable position, the security shade comprising:

a panel movably mounted with respect to the surface of the seatback member for movement between a first configuration in which the panel lays along the surface of the seatback member when the seatback member is in the occupiable position, and a second configuration in which the panel extends above the cargo area and at least partially conceals the cargo area from view from the exterior of the vehicle when the seatback member is in the occupiable position; and wherein the seatback member is movable between the generally upright, occupiable position and a generally horizontal stowed position in which the surface faces generally upward and extends from a forward extent to a rearward extent; and wherein the panel is movable to a third configuration in which the panel lays against the surface of the seatback member when the seatback member is in the stowed position; and wherein the panel is movable to a fourth configuration in which the panel extends from a point on the surface to a point forward of the forward extent when the seatback member is in the stowed position.

16. The security shade of claim 15, wherein the panel is telescopically extendible and retractable.

17. The security shade of claim 15, wherein the panel is pivotably mounted to the surface of the seatback.

18. A vehicle comprising:

a first seat assembly adjacent to a cargo area, the first seat assembly including a seat cushion member and a seatback member, the seatback member movable between a generally upright, occupiable position and a generally horizontal stowed position and having a surface that generally faces rearward relative to the seat assembly and toward the cargo area when the seatback member is in the occupiable position and generally upward when the seatback member is in the stowed position, the surface extending from a forward extent to a rearward extent when the seatback member is in the stowed position;

a second seat assembly located forward of the first seat assembly;

a hinge;

a telescopically extendible and retractable panel connected to the surface of the seatback member by the hinge, and moveable between a first configuration in which the panel lays against the surface of the seatback member when the seatback member is in the occupiable position, a second configuration in which the panel extends above the cargo area and at least partially conceals the cargo area from view from the exterior of the vehicle when the seatback member is in the occupiable position, a third configuration in which the panel lays against the surface of the seatback member when the seatback member is in the stowed position, and a fourth configuration in which the panel extends from a point on the surface to a point forward of the forward extent, and contacts or is adjacent to the second seat assembly when the seatback member is in the stowed position;

a first support member configured to support the panel when the panel is in the second configuration; and a second support member configured to support the panel when the panel is in the fourth configuration.

19. A vehicle comprising:

a first seat assembly adjacent to a cargo area, the first seat assembly including a seat cushion member and a seatback member, the seatback member movable between a generally upright, occupiable position and a generally horizontal stowed position and having a surface that generally faces rearward relative to the seat assembly and toward the cargo area when the seatback member is in the occupiable position and generally upward when the seatback member is in the stowed position, the surface extending from a forward extent to a rearward extent when the seatback member is in the stowed position;

a second seat assembly located forward of the first seat assembly;

a hinge;

a telescopically extendible and retractable panel connected to the surface of the seatback member by the hinge, and moveable between one configuration in which the panel extends above the cargo area and at least partially conceals the cargo area from view from the exterior of the vehicle when the seatback member is in the occupiable position, and another configuration in which the panel extends from a point on the surface to a point forward of the forward extent, and contacts or is adjacent to the second seat assembly when the seatback member is in the stowed position.

* * * * *